(12) United States Patent
Singh

(10) Patent No.: US 12,038,890 B2
(45) Date of Patent: Jul. 16, 2024

(54) ENVIRONMENTAL HAZARD AND RISK INFORMATION SYSTEM

(71) Applicant: Ambient Ridge, Inc., Mt. Kisco, NY (US)

(72) Inventor: Raj K. Singh, Irvine, CA (US)

(73) Assignee: Ambient Ridge, Inc., Mt. Kisco, NY (US)

( * ) Notice: Subject to any disclaimer, the term of this patent is extended or adjusted under 35 U.S.C. 154(b) by 0 days.

(21) Appl. No.: 17/820,078

(22) Filed: Aug. 16, 2022

(65) Prior Publication Data

US 2023/0060380 A1 Mar. 2, 2023

Related U.S. Application Data

(60) Provisional application No. 63/260,676, filed on Aug. 27, 2021.

(51) Int. Cl.
*G06F 17/00* (2019.01)
*G06F 16/215* (2019.01)
*G06F 16/2455* (2019.01)
*G06F 16/29* (2019.01)

(52) U.S. Cl.
CPC ...... *G06F 16/215* (2019.01); *G06F 16/24553* (2019.01); *G06F 16/29* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 5,132,968 A * | 7/1992 | Cephus | ................ | G08B 26/007 370/349 |
| 7,463,955 B1 * | 12/2008 | Robinson | ............. | G08G 5/0021 340/963 |
| 9,014,983 B1 * | 4/2015 | Uy | ........................ | G01C 13/002 244/30 |
| 10,929,941 B1 * | 2/2021 | Suleman | ............. | H04L 12/1818 |
| 11,067,718 B1 * | 7/2021 | Brett | ........................ | H04W 4/38 |
| 11,626,001 B1 * | 4/2023 | Khmelev | ............... | G08B 21/12 340/532 |
| 2008/0129495 A1 * | 6/2008 | Hitt | ........................ | A01G 25/167 340/539.26 |
| 2008/0129525 A1 * | 6/2008 | Barrus | ................ | G08B 25/016 340/669 |
| 2009/0040051 A1 * | 2/2009 | DeRieux | ................ | A62C 99/00 340/573.1 |

(Continued)

*Primary Examiner* — Hung D Le

(57) ABSTRACT

In a computer-implemented method for transformation of inconsistent environmental data, environmental data is received from a plurality of data sources, wherein each data source of the plurality of data sources is associated with a geographic region and maintains the environmental data using at least one data format of a plurality of disparate data formats, such that the environmental data is received in the plurality of disparate data formats. The environmental data is transformed from the plurality of disparate data formats into a consistent data format, such that the transformed environmental data is in a standardized format capable of direct comparison and analysis. The transformed environmental data is stored in a database configured to receive and perform searches on the transformed environmental data.

17 Claims, 12 Drawing Sheets

(56) References Cited

U.S. PATENT DOCUMENTS

| | | | |
|---|---|---|---|
| 2010/0020166 A1* | 1/2010 | Levine | G08B 21/12 348/82 |
| 2010/0256912 A1* | 10/2010 | Nielsen | G01V 3/08 324/329 |
| 2011/0133927 A1* | 6/2011 | Humphrey | G08B 21/04 600/300 |
| 2012/0047137 A1* | 2/2012 | Stergiou | G06F 16/24558 707/769 |
| 2012/0310548 A1* | 12/2012 | Takahashi | G06F 3/04842 702/24 |
| 2013/0144527 A1* | 6/2013 | Kuhnreich | G01N 33/00 702/2 |
| 2014/0095117 A1* | 4/2014 | Vainshtain | G06F 30/20 703/1 |
| 2015/0112730 A1* | 4/2015 | Binion | G07C 5/008 705/4 |
| 2015/0213534 A1* | 7/2015 | Lunenfeld | G06F 15/17306 705/26.41 |
| 2015/0269347 A1* | 9/2015 | Bhatt | G16H 50/30 705/2 |
| 2015/0323699 A1* | 11/2015 | Gariepy | G05B 15/00 702/2 |
| 2015/0338281 A1* | 11/2015 | Ross | G06F 11/301 236/44 A |
| 2016/0070920 A1* | 3/2016 | Joshi | H04L 67/12 726/28 |
| 2016/0171862 A1* | 6/2016 | Das | G08B 21/02 340/686.1 |
| 2017/0140631 A1* | 5/2017 | Pietrocola | G01J 1/4204 |
| 2017/0146970 A1* | 5/2017 | Joo | G05B 19/042 |
| 2017/0193260 A1* | 7/2017 | Prusik | G06K 7/1473 |
| 2018/0210206 A1* | 7/2018 | Eronen | G02B 27/0172 |
| 2019/0149353 A1* | 5/2019 | Khalid | H04W 4/80 455/420 |
| 2019/0197710 A1* | 6/2019 | Wang | G06T 7/55 |
| 2020/0177692 A1* | 6/2020 | Adams | H04L 69/329 |
| 2020/0189579 A1* | 6/2020 | Haque | B60W 30/09 |
| 2020/0292694 A1* | 9/2020 | Fleming | H01Q 21/205 |
| 2020/0406905 A1* | 12/2020 | Dong | B60W 60/00274 |
| 2021/0026448 A1* | 1/2021 | dos Santos Silva | H04W 12/06 |
| 2021/0124350 A1* | 4/2021 | Kirigan | G06V 20/56 |
| 2021/0124355 A1* | 4/2021 | Kirigan | G06V 20/58 |
| 2021/0203687 A1* | 7/2021 | Rabin | H04L 63/20 |
| 2021/0325906 A1* | 10/2021 | White | B64C 39/024 |
| 2021/0372921 A1* | 12/2021 | Burns | G01B 11/162 |
| 2021/0398666 A1* | 12/2021 | Maslik | G16H 15/00 |
| 2022/0044554 A1* | 2/2022 | Rietdorf | G08G 1/167 |
| 2022/0067547 A1* | 3/2022 | Kwatra | G06N 5/04 |
| 2023/0039961 A1* | 2/2023 | Lingle | G06F 11/3062 |
| 2023/0084106 A1* | 3/2023 | Sobol | G08B 21/22 340/5.61 |
| 2023/0116939 A1* | 4/2023 | Spiro | F21V 23/06 362/382 |

* cited by examiner

ENVIRONMENTAL HAZARD AND RISK INFORMATION SYSTEM

RELATED APPLICATION

This application claims priority to and the benefit of U.S. Provisional Patent Application 63/260,676, filed on Aug. 27, 2021, entitled "ENVIRONMENTAL HAZARD AND RISK INFORMATION SYSTEM," by Raj K. Singh, and assigned to the assignee of the present application, which is incorporated herein by reference in its entirety.

BACKGROUND

Environmental and natural hazard information is important for allowing individuals, property developers and owners, as well as renters, to know and understand the climate and environmental hazard and risk information associated with the locations. There are a myriad of sources for obtaining certain types of environmental and natural hazard information, such as government institutions at the national, regional, and local level, as well as private organizations. This information varies greatly from locality to locality, is often difficult to obtain, and there are often such variance in data type that comparison between data for two locales is often difficult and typically indecipherable to users.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Figure 1:
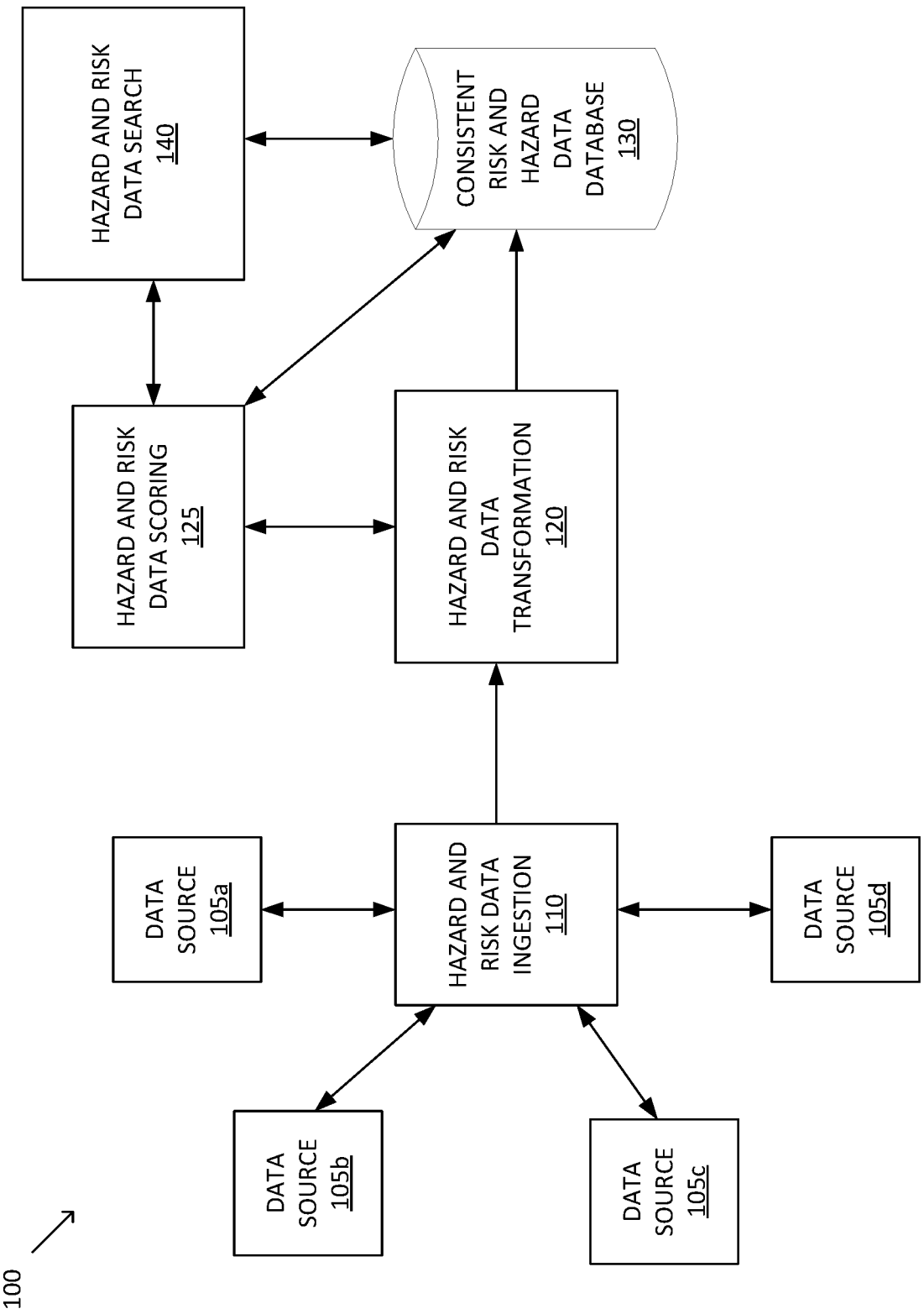
FIG. 1 is a block diagram illustrating an embodiment of an example system for transforming and searching environmental hazard and risk information, according to embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "determining," "identifying," "comparing," "generating," "executing," "configuring," "storing," "directing," "accessing," "updating," "collecting," or the like, refer to the actions and processes of an electronic computing device or system such as: a host processor, a processor, a memory, a cloud-computing environment, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions or code residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, code and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Embodiments described herein provide an integrated "environmental and natural hazards intelligence" platform for providing greater transparency into local environmental, natural hazard, climate and other risk information. The platform addresses the challenges of combining the relevant risk and hazard data—data that can often be fragmented, varied and quite complex—to create a database that is designed to be clear, responsive and performant. Also, to leverage that information, the described embodiments provide features, reporting tools, and a suite of services intended to provide users with useful information to assist them with their decision-making, planning or other needs related to environmental and natural hazards.

Environmental and natural hazard information is important for allowing individuals, property developers and owners, as well as renters, to know and understand the climate and environmental hazard and risk information associated with the locations. There are a myriad of sources for obtaining certain types of environmental and natural hazard information, such as government institutions at the national, regional, and local level, as well as private organizations. This information varies greatly from locality to locality, is often difficult to obtain, and there are often such variance in data type that comparison between data for two locales is often difficult and typically indecipherable to users.

Embodiments described herein solve the problem of material challenges posed when ingesting inconsistent data and transforming that data to provide consistency for the geographic space for which that data is received. Also, the described embodiments accomplish this while creating usable interfaces to provide that information in a way that is readily accessible, understandable, an allows for weighting and scoring approaches, enabling the real-time running of overall hazard reports, with scoring and weight adjustment capabilities, for any location in a region (e.g., the United States).

The described embodiments provide systems and methods for generating accessible and easy to understand information from data sources that are often inconsistent and disparate. The system may source its data from a variety of sources, including open data sources such as federal government databases, e.g., the Environmental Protection Agency (EPA) or the National Oceanic and Atmospheric Administration (NOAA), as well as state, local city, county and other databases. The data, coming from disparate sources and in different types, is transformed into consistent data that can be compared and analyzed appropriately in a normalized fashion.

This description allows for review and comparison of environmental and natural hazard information, by:

1) combining environmental, natural hazards or other risks together;
2) enabling transformation of inconsistent area data so that it is able to be presented geospatially and in a searchable format;
3) scoring and weighting algorithmic features that apply data science and technological learnings to customize the data analysis;
4) weighting and selection capabilities, such as providing the ability for users to set their own specific weight and search criteria in order to tailor their search or comparison parameters; and
5) providing improved and easy to understand reporting of the data.

The described embodiments ingest and then transform a range of different types of data, much of which is inconsistent environmental, natural hazard, or other risk data, pertaining to various areas across the region (e.g., the United States) to provide consistency or compatibility to that data. For example, the system may receive oil, gas and fracking well data from several data sources, each of which may report the data in different formats. This data is transformed, e.g., by normalizing and standardizing the data so that the system can produce consistent and informational reports across different regions. It should be appreciated that the described embodiments are capable of transforming any type of data related to environmental risks and hazards, as well as climate related data, which is collectively referred to herein as "environmental" data, and that environmental data pertains to any such data.

Geomaps are maps including regions with colors and/or values assigned to areas of the region that represent geospatial data. The described embodiments are able to present data on geomaps for the geographic space for which the data is received (after applying processes to standardize and normalize that data across the region), are able to present the data with usable interfaces created or designed to provide the information in ways to make it more understandable and accessible, and are able to convert the area data, using processes and algorithms, to make it searchable, score-able and focused or targeted to the user's desired location or certain other parameters or priorities.

Accordingly, embodiments of the present invention amount to significantly more than merely using a computer to transform and search environmental hazard and risk information. Instead, embodiments of the present invention specifically recite novel processes, rooted in computer technology, for transforming inconsistent environmental hazard and risk data into data that is consistent over a geographic region, such that searching environmental hazard and risk over the region can be performed, thereby improving performance of a computer system and searches of environmental hazard and risk data, to overcome a problem specifically arising in the realm of environmental hazard and risk data.

Example System for Transformation of Inconsistent Environmental and Natural Hazard Data Example embodiments described herein provide systems and methods for generating accessible and easy to understand information from data sources that are often inconsistent and disparate. The data, coming from disparate sources and in different types, is transformed into consistent data that can be compared and analyzed appropriately in a normalized fashion. This search data can be customized according to search preferences, to provide an improved and enhanced user experience.

FIG. 1 is a block diagram illustrating an embodiment of an example system 100 for transforming and searching environmental hazard and risk information, according to embodiments. System 100 includes hazard and risk data ingestion module 110 for ingesting data from disparate data source 105a thorough 105d, hazard and risk data transformation module 120, hazard and risk data scoring 125, consistent hazard and risk data database 130, and hazard and risk data search module 140. It should be appreciated that hazard and risk data ingestion module 110, hazard and risk data transformation module 120, hazard and risk data scoring 125, consistent hazard and risk data database 130, and hazard and risk data search module 140 can be under the control of a single component of an enterprise computing environment (e.g., a computer system 600) or can be distributed over multiple components.

It should be appreciated that system 100 may ingest data at hazard and risk data ingestion module 110 from a variety of sources, including open data sources such as federal government databases, e.g., the Environmental Protection Agency (EPA) or the National Oceanic and Atmospheric Administration (NOAA), as well as state, local city, county and other databases.

In accordance with some embodiments, hazard data is requested from data sources 105a-d. For example, a CRON Based Lambda Function that runs periodically (e.g., daily) makes an HTTP POST Request to a data source 105a. For example, an HTTP Post Request can be made to an EPA Facility Registry Service (FRS) MapServer to request particular information. In a specific example, the request can be for information marked "ACRES" to identify brownfield locations. In some embodiments, the data received is reconciled against stored data to determine whether new data is received. If there is no new data received after comparison to the stored data, the process completes. If new data is identified, the data is forwarded to hazard and risk data transformation module 120.

The data is received at hazard and risk data transformation module 120 and, coming from disparate sources and in different types, is transformed into consistent data that can be compared and analyzed appropriately in a normalized fashion. The consistent data is stored at consistent hazard and risk data database 130. Hazard and risk data search module 140 is configured to receive and perform searches on the data of consistent hazard and risk data database 130.

Conventional environmental and natural hazard information is typically varied and complex in terms of data source, data type, and data formats, such that the data is inconsistent across different sources, making comparison generally unachievable across different sources. The underlying data for these types of data can be particularly challenging. These challenges include:
the difficulty in locating or accessing certain data;
the fragmentation of the data (in some cases with respect to the same hazard and in other cases across hazards);
the inconsistency with which that data is presented (in some cases with respect to the same hazard and in other cases across hazards);
how technical or scientific the information is where available, making it hard to understand or interpret for the average consumer; and
the different frequencies with which the datasets update (giving rise to different "pull" frequencies).

The described embodiments address these challenges, enabling the ingestion of relevant environmental health and natural hazards' or potential risks' information and produce meaningful reports. In order to allow comparisons and analyses of such data, embodiments described herein transform the data to provide standardized data that is capable of being compared.

After the data has been accessed and ingested, the system is configured to transform the data by standardizing or normalizing the data, and aggregating the data to prepare the data for the geospatial, scoring, weighting and selection innovations designed to enable the platform's features.

The system ingests and then transforms a range of types of data, much of which is environmental health and natural hazard data with inconsistency challenges as described above, pertaining to various areas across a region (e.g., the United States) to provide consistency or compatibility to that data:
1. presented on geomaps for the entire geographic space for which the data is received;
2. with usable interfaces created or designed to provide the information in ways to make it more understandable and accessible; and
3. then processes to standardize and/or normalize the data across the region such that area risk data is able to be transposed onto geomaps and to be subject to processing search, scoring, comparing and/or weighing the data.

Because this integrated data is often not "clean" data, significant standardization and/or normalization work is often necessary in addition to reconciliation work to prepare the data and to verify its integrity as it is ingested and then integrated onto the environmental and natural hazards intelligence platform and database.

Figure 2:
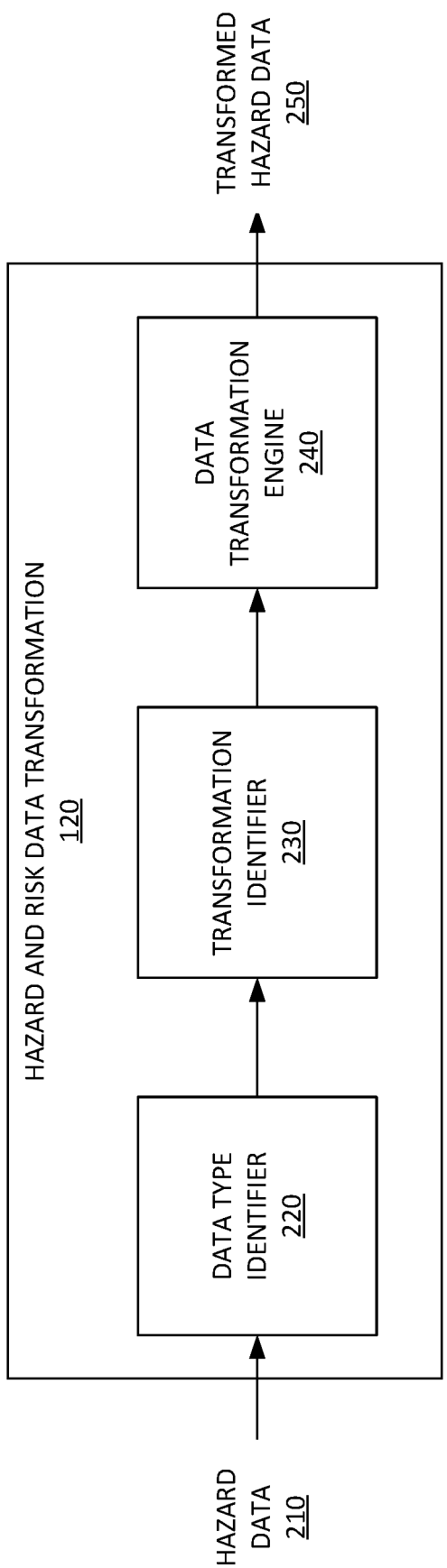
FIG. 2 is a block diagram illustrating an example environmental hazard and risk data transformation module, according to an embodiment.

FIG. 2 is a block diagram illustrating an example environmental hazard and risk data transformation module 120, according to an embodiment. Environmental hazard and risk data transformation module 120 includes data type identifier 220, transformation identifier 230, and data transformation engine 240. It should be appreciated that data type identifier 220, transformation identifier 230, and data transformation engine 240 can be under the control of a single component of an enterprise computing environment (e.g., a computer system 600) or can be distributed over multiple components.

Hazard data 210 is received (e.g., from hazard and risk data ingestion module 110) at data type identifier 220 of environmental hazard and risk data transformation module 120. Data type identifier 220 is configured to inspect hazard data 210 and to determine a data type of hazard data 210. For example, data received from an EPA Facility Registry Service (FRS) MapServer may be received in a GeoJSON format (e.g., to describe brownfield locations). The data is further inspected at transformation identifier 230 to determine what type of transformation or transformations to apply to hazard data 210 upon identification of the data type.

At data transformation engine 240, hazard data 210 is transformed according to the transformation or transformations identified at transformation identifier 230. For example, transformations to hazard data 210 can include: renaming object keys (e.g., changing facility_name to name), changing geospatial projections (e.g., transforming EPSG:4269 data format to EPSG:4326 data format), transforming GeoJSON results into a standardized JSON format, etc. Data transformation engine 240 generates transformed hazard data 250, and forwards transformed hazard data 250 to consistent hazard and risk data database 130 for storage. For example, transformed hazard data 250 is forwarded as a GraphQL Mutation to the consistent hazard and risk data database 130. In some embodiments, consistent hazard and risk data database 130 is a geographic information system (GIS) database.

In some embodiments, concurrent or subsequent the generation of transformed hazard data 250, hazard and risk data scoring 125 performs an area-based scoring operation on the transformed hazard data 250. Performing the area-based scoring operation at this point allows for the precomputation and storage of the precomputed scores, that can ultimately be returned responsive to search request. This is of particular advantage for large and dynamic datasets, such as those pertaining to air quality index (AQI), so as to provide a fast response time. In some embodiments, data sets having less data (e.g., brownfields or nuclear plants) can be computed at request time. It should be appreciated that the scoring operation can be performed at search time or at ingestion, and that the precomputation allows for the reduction of computational resources used at the time of the search.

Scoring operations are applied to the hazard data (e.g., transformed hazard data) to provide information of the relative risk associated with particular hazards. The scoring operations are applied to an area, also referred to herein as a geozone. In accordance with some embodiments, the geozone based scoring operation appends locations with geozone based datasets (e.g., counties, zip codes, census tracts, or any other polygon based feature).

Locations are appended with geozone based datasets (e.g., counties, zip codes, census tracts, or any other polygon based feature). Various operations can be used to append the locations using different operations, such as and without limitation: Overlapping Hierarchical Clustering (OHC), DBScan, and K-means analysis. New densities (e.g., of brownfields) are applied within the geozones as parameters to the scoring algorithm which precomputes a score. It should be appreciated that these operations generally associate risks and hazards, and the scores thereof, to geographic regions (e.g., geozones).

Hazard and risk data scoring 125 forwards the scoring information to consistent hazard and risk data database 130 for storage along with the associated hazard data. For example, the scoring information is forwarded as a GraphQL Mutation to the consistent hazard and risk data database 130.

Figure 3:
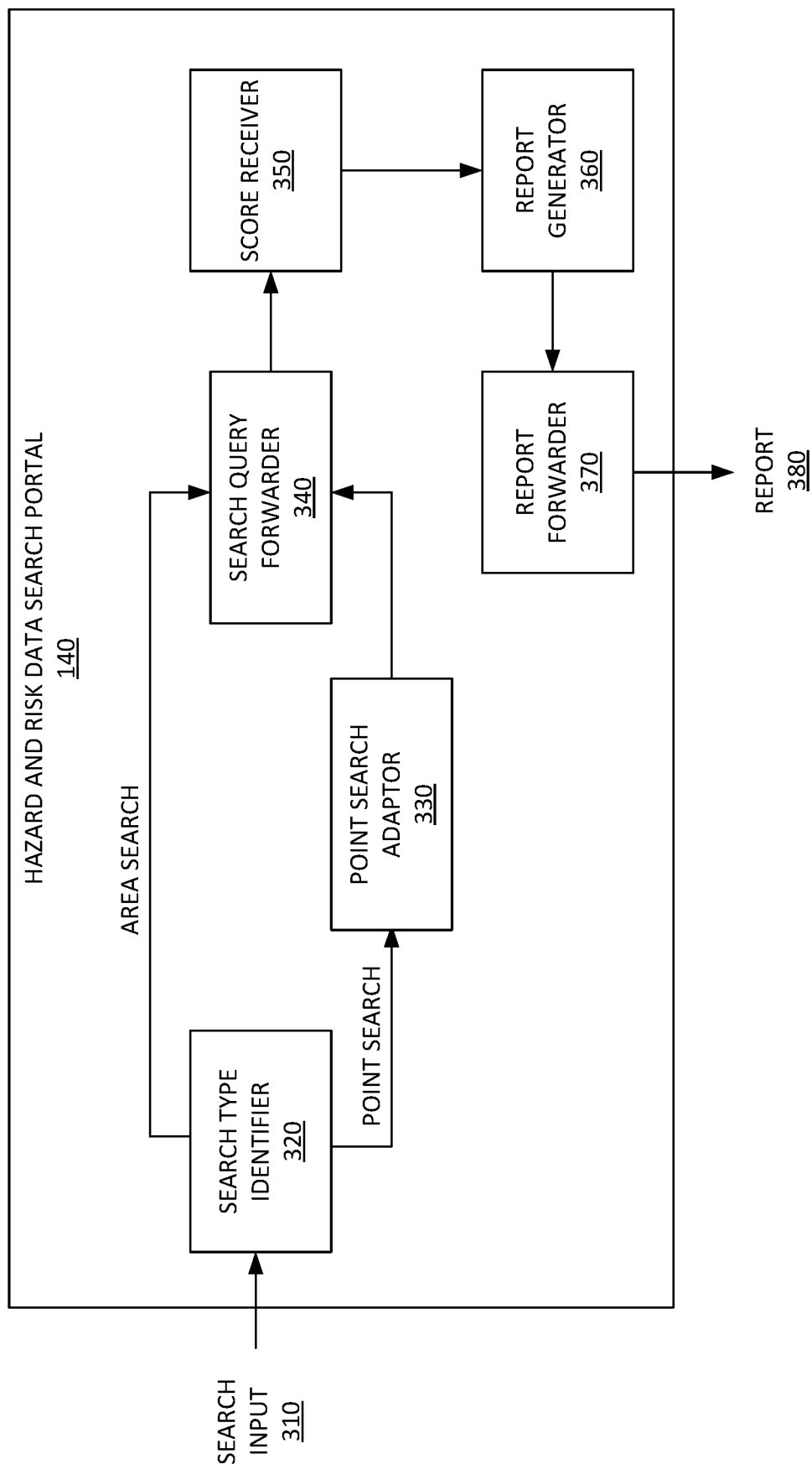
FIG. 3 is a block diagram illustrating an example environmental hazard and risk data search module, according to an embodiment.

FIG. 3 is a block diagram illustrating an example environmental hazard and risk data search module 140, according to an embodiment. Using a search portal, e.g., via a website or an application, users can discover information about environmental and natural hazards, as well as about their risks and mitigation options if any, for their current location or for other locations that they select. They can provide search information, such as, for example, for an address, a desired zip code, or another area-defined search. A report is then provided detailing results and scores with respect to that location (such as, for example, on a scale from "A" for best to "F" for worst) for certain hazards. Other hazard or risk information that may pertain to that area may also be available informationally (such as, for example, pollution incidents) without any scoring applied.

Environmental hazard and risk data search module 140 includes search type identifier 320, point search adaptor 330, search query forwarder 340, score receiver 350, report generator 360, and report forwarder 370. It should be appreciated that search type identifier 320, point search adaptor 330, search query forwarder 340, score receiver 350, report generator 360, and report forwarder 370 can be under the control of a single component of an enterprise computing environment (e.g., a computer system 600) or can be distributed over multiple components.

Search input 310 is received at search type identifier 320 of environmental hazard and risk data search module 140 (e.g., via an API server). Search input 310 is in the form of a geographic location such as an area (e.g., county or zip code) or a point (e.g., an address). Search type identifier 320 is configured to determine whether search input 310 is an area search or a point search. If search input 310 is an area search, search input 310 is converted to a search query for accessing the hazard scoring from consistent hazard and risk data database 130 for the searched area.

If search input 310 is a point search, search input 310 is forwarded to point search adaptor 330 for converting the point search to a search query that can be searched at consistent hazard and risk data database 130. In some embodiments, point search adaptor 330 performs a nearest neighbors analysis of address geospatial coordinates within proximity to a preconfigured radius (e.g., in miles). This allows for the density of hazards to be computed as parameters to the cluster to point scoring algorithm.

Search query forwarder 340 forwards the search query to consistent hazard and risk data database 130 to retrieve the queried information. Score receiver 350 receives the score from consistent hazard and risk data database 130. Report generator 360 generates a report including the score. Report forwarder 370 forwards the report 380 to the API for receipt at a client device accessible by the user.

Many of the hazards are presented in one of several major categories. For example, these categories currently are described as follows: Natural Hazards, Industrial Hazards, Infrastructure, and Pollution. Many of the datasets (which include, but are not limited to: air quality, hurricanes, sever floods, tornadoes, natural gas pipelines, high voltage lines, registered cell towers, oil/gas and fracking wells, nuclear plants, Superfund sites, Brownfield sites, and radon) are associated with a category.

The user can review, at a high level, most of the location search results clustered in this way by certain categories and then can delve deeper into results of interest. For example, if the searched area provided a surprising score for federally listed Brownfield sites, the user may want to click on the Brownfields line within the report's results. Doing so, various types of additional information may be provided, such as:

the aggregate result findings (e.g., how many were found in that geozone or proximate to it);
a description of Brownfields in case the user is generally unfamiliar with what they are;
linkable option to access more detailed information from an article (describing in greater detail what Brownfield sites are, what types of impacts they could have to people or property values in the area, and describe what if anything can be done about them); and
showing the relevant Brownfield sites, including having the ability to access specific data about each identified one.

The system is also capable of offering a variety of novel features. For example, the system allows users to compare locations. The comparison feature enables people to compare multiple locations (e.g., point locations and areas locations) to highlight their different findings with respect to the relevant datasets. In some embodiments, the system offers the ability to personalize the reports to the users' preferences, with certain hazards or datasets weighted greater than others. For example, the system's weighting adjustment feature enables users to adjust weights given various hazards or categories within the scoring algorithm. These can be set from 0 (having no weight) to 1 (having significant weight) before the search and scoring process runs and produces the results for that search. This is a particularly useful innovation so that users can directly specify or enter search parameters to make the resulting search result findings more relevant to their specific concerns or situations. For example, users interested in flooding, but not radon, may choose to weight flooding higher than radon in a report to produce a report that is tailored to their interests. Other users, for example, may be more concerned about air pollution than other hazards or risks. If so, they may want to weigh air pollution higher than other hazards or risks before searching and comparing different areas.

In addition, users can access more information about a variety of different hazards and related content. In addition to the report results, the site has a range of informational content on many hazards (to understand the hazard, its potential risk, and mitigants) and other articles of interest.

Embodiments described herein provide a system for transforming inconsistent environmental and natural hazard information data to prepare the data for geospatial processing and to combine and present the hazard or risk information on a geomap.

Because the described system enables searches of a specific location or of an area with respect to various hazards or risks that also involve specific points or general areas (e.g., points, lines or areas), the described geospatial algorithms handle complexities arising from it presentation of datasets, whether location-based or geozone-based, of hazard or risk information on a geomap, before it can proceed with scoring the data across the hazard and then the category, applying weighting as applicable. For example, a search may be of an area, such as a town or a zip code, also referred to as a geozone, (as compared to a specific home address which would be a point) and the relevant hazard data findings will be a combination of geozones (such as, for example, a radon level) and points (such as, for example, registered cell towers or Superfund sites).

The described embodiments allow for search results to represent items or areas geospatially on maps (as well as according to scoring and weighting in some embodiments). Searches allow users can submit to submit i) a street address (e.g., a location point) or ii) an area search (e.g., a zip code, town, city, or county), also referred to herein as a "geozone." In other words, the described geomapping presents information related to various types of hazard or risk data (each of which may exist either as a point, line, or a zone) and to present the risk data in relation to its proximity or overlap with a search that itself is considered as either a point or zone. The following are examples of providing searches results for different types of datasets with respect to that geozone. The described system approaches these geospatial treatments applying techniques based on the hazard information's classification into one of four conceptual categories:

1) Point to Point;
2) Geozone to Point;
3) Geozone to Line Streams; and
4) Geozone to Geozone Dataset.

The point to point technique applies a relatively straightforward proximity analysis. For the other conceptual categories, embodiments described herein use a "nearest neighbor" analysis. That analysis draws upon current mathematical or statistical method formulas, but may involve other operations, e.g., in the ordering of the formulas and in how it approaches the scoring and the scoring tiering of the categories and areas (more on scoring to follow below). Starting from a high level, the system produces an overall weighted score for its user searches across the categories (such as, for example, its "Parent Categories" including Pollution, Natural Hazards, etc.) with underlying searches for geomap results and scores, that can basically one of these three forms:

1) Geozone to Point,
2) Geozone to Line stream, and
3) Geozone to Geozone.

Geozone to Point

The Geozone to Point Approach includes several types of risk data. For example, this category includes contaminated sites (e.g., Superfunds and Brownfield sites); oil, gas and fracking wells; nuclear power plants; and registered cell towers. These points are converted to latitude and longitude locations with the region (e.g., as they exist across the United States) and then are compared against a point (as for a street address search) or a geozone (as for a zip code, town, city, or county search). For example, a user may request a zip code score and the system will compute area information that includes information about the wells (e.g., a point-based data set) in relation to that zip code to calculate 1) the proximity to each of those items as points using proximate distance analysis when compared to the searches (and potentially, such as in the case of nuclear plants, with different multipliers or weightings from that latitude and longitude point representing level of risk for that proximity associated with its fallout zone-type risk) and 2) the density of those points in that area.

Next, the system calculates a national average of those densities (after first normalizing it if need be, such as to crop outliers) and then percentile ranks these over the different counties or zip codes in the US. Next, the density of those zip codes over the area of that zip code or county (such as in square miles) is considered and statistic that is used to generate a z-score is generated. Next, those z-scores are percentile ranked across the region (e.g., the United States) to create an ordinal distribution of different percentile ranks. That then becomes the score for that geozone in this zone to point formula, with normalization from 0 to 100. It should be appreciated that this ordinal ranking is necessary to avoid unrepresentative results that could otherwise arise due to the large disparities in size between counties given that the density scores are computed on a per square mile basis.)

Geozone to Line Streams

The Geozone to Line Streams Approach also includes several types of hazard or potential risk data. For example, this category includes pipelines, high voltage lines, and hurricane and tornado tracking, various hazards data with a line string informational format. In some ways, they are similar to Geozone to Point categories in that they use proximate distance analysis and scoring with respect to the search location. These are treated like the nuclear plant risk with different multipliers or weightings depending on the distance.

Then that resulting information would typically be also percentile ranked over an ordinal distribution notionally, with any extreme outliers removed if necessary so as to avoid distortions that might make the resulting set generally meaningless.

Geozone to Geozone

The Geozone to Geozone Dataset Approach also includes several types of risk data. For example, this category includes radon levels and certain water quality and air quality information. Using an air quality example, the system uses information from the federal government (the EPA)'s annual distribution per county of $90^{th}$ percentile annual air quality scores. The searched geozone is matched to the appropriate county geozone. In some ways, these are also similar to Geozone to Point categories in that they use proximate distance analysis with respect to the search location, but also utilize interpolation for missing area data.

Then that resulting information is percentile ranked over an ordinal distribution notionally, with any extreme outliers removed, if necessary, so as to avoid distortions that might make the resulting set generally meaningless. Similarly, radon information is currently presented at the county level with similar interpolations for missing counties. Then a percentile score is computed across the region (e.g., the United States).

Figure 4A:
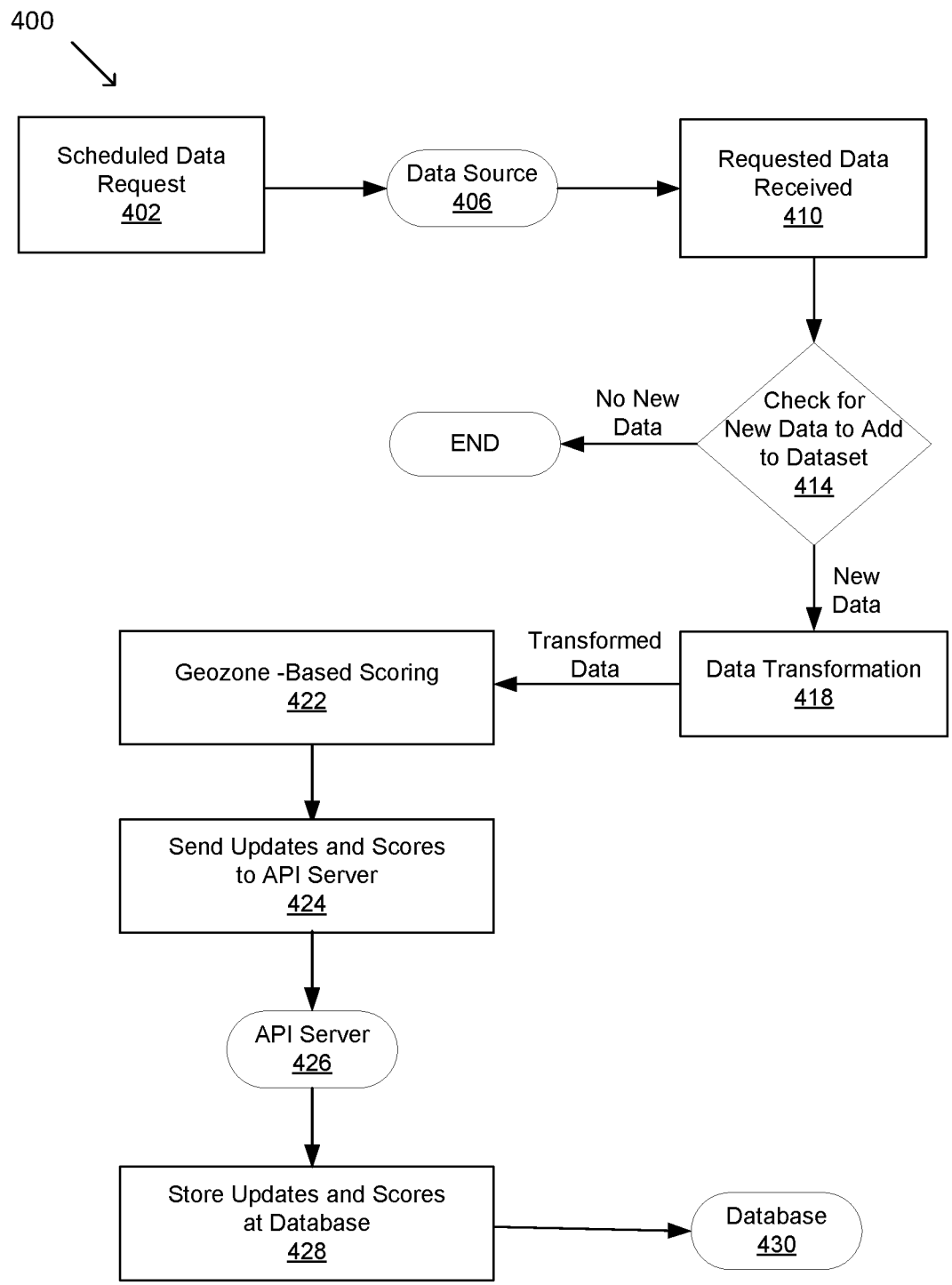
FIG. 4A illustrates a flow diagram illustrating an example method for transforming environmental hazard and risk data for a point-based source, in accordance with embodiments.
Figure 4B:
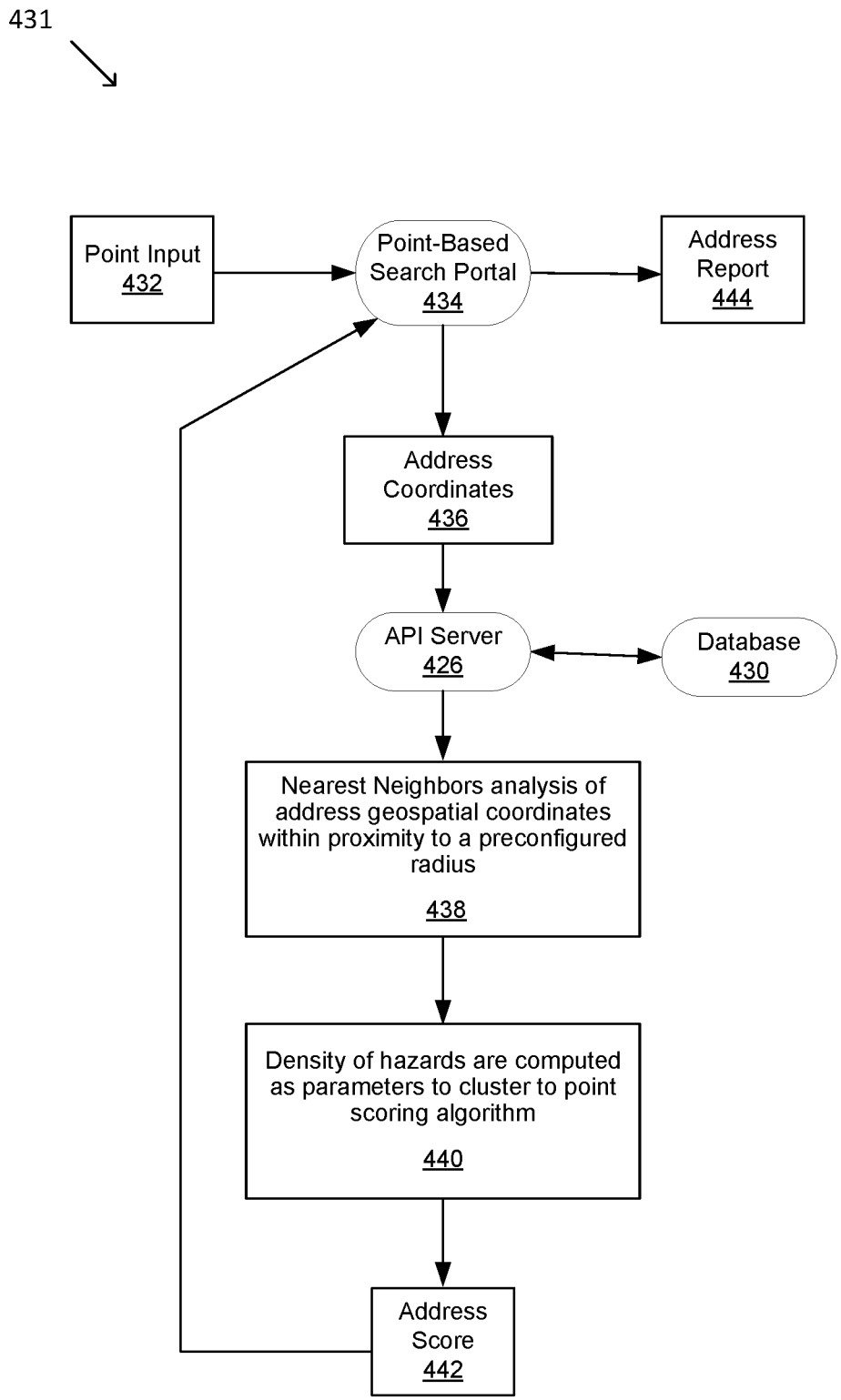
FIG. 4B illustrates a flow diagram illustrating an example method for a point-based search of consistent environmental hazard and risk data for a point-based source, in accordance with embodiments.
Figure 4C:
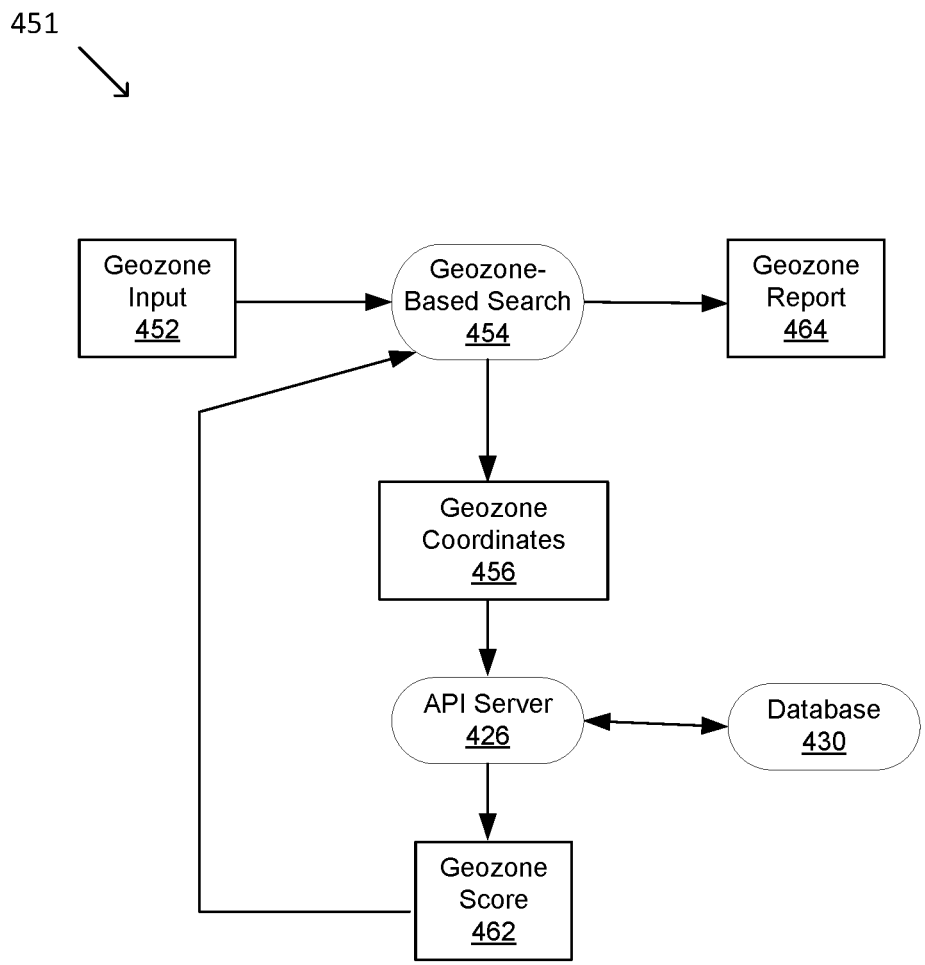
FIG. 4C illustrates a flow diagram illustrating an example method for a zone based search of consistent environmental hazard and risk data for a point-based source, in accordance with embodiments.

FIGS. 4A through 4C illustrate example data flow diagrams of systems for transforming environmental hazard and risk data and for searching consistent environmental hazard and risk data, in accordance with embodiments. As illustrated, the example method illustrated in FIG. 4A is for transformation for single point-based sources. The example methods of FIGS. 4B and 4C are for search and report generation for area searches (e.g., geozones) and point searches (e.g., addresses).

FIG. 4A illustrates a data flow diagram 400 of an example system for transforming environmental hazard and risk data for a point-based source, in accordance with embodiments. A point-based source of environmental data (e.g., environmental, hazard, and risk data) refers to environmental data pertaining to discrete locations of such data. Examples of point-based sources of environmental data include power plants, brownfields, oil, gas, and fracking wells, superfund sites, nuclear reactors, cell towers, etc.

At block 402, a scheduled data request for environmental data is executed by sending the request to a data source 406. It should be appreciated that the environmental data can pertain to any type of data collected, managed, or maintained by a monitoring entity, such as a government agency, that pertains to any environmental information, including climate information, environmental risks or hazards, or potential environmental risks or hazards. It should be appreciated that the scheduled data request can be performed periodically, according to a preset schedule, or on demand. Moreover, it should be appreciated that in accordance with various embodiments, the data request can be a push request or a pull request.

At block 410, the requested environmental data is received from data source 406. At block 414, the received environmental data is checked to determine whether the received environmental data includes new data to add to the stored dataset. If the received environmental data does not include any new data, flow diagram 400 ends. If the received environmental data does include new data, transformation of the data is performed at block 418. At block 418, the received environmental data is transformed into consistent data that can be compared and analyzed appropriately in a normalized fashion. In some embodiments, the data transformation is performed as described in accordance with environmental hazard and risk data transformation module 120 of FIGS. 1 and 2.

At block 422, scoring operations are performed on the transformed data to provide information of the relative risk associated with environmental data received. In some embodiments, the scoring operations are applied to an area, also referred to herein as a geozone. In accordance with some embodiments, the geozone based scoring operation appends locations with geozone based datasets (e.g., counties, zip codes, census tracts, or any other polygon based feature).

At block 424, the updated environmental data and associated scores are sent to an API server 426, which forwards the updated environmental data and associated scores to a database 430 for persistent storage. Database 430 is configured to receive and perform search on the stored environmental data.

FIG. 4B illustrates a data flow diagram 431 of an example system for a point-based search of consistent environmental hazard and risk data for a point-based source, in accordance with embodiments. A point input search request 432 is received at point-based portal 434 (e.g., a website or application). A point input search request 432 includes a point input, such as an address or GPS coordinates. At block 436, the address is converted to coordinates. The coordinates and search request 432 are forwarded to API server 426 for processing the search by accessing database 430.

At block 438, a nearest neighbors analysis of the address geospatial coordinates within proximity to a preconfigured radius is performed. At block 440, the density of hazards is computed as parameters to cluster to a point scoring algorithm to generate address score 442. Address score 442 is forwarded to point-based search portal 434, and output as part of address report 444.

FIG. 4C illustrates a data flow diagram 451 of an example system for a zone based search of consistent environmental hazard and risk data for a point-based source, in accordance with embodiments. A geozone input search request 432 is received at geozone-based portal 454 (e.g., a website or application). A geozone input search request 452 includes an area input, such as city or a zip code. At block 456, the geozone is converted to geozone coordinates. The geozone coordinates and search request 452 are forwarded to API server 426 for processing the search by accessing database 430, resulting in the output of geozone score 462. Geozone score 462 is forwarded to geozone-based search portal 454, and output as part of geozone report 464.

Figure 5A:
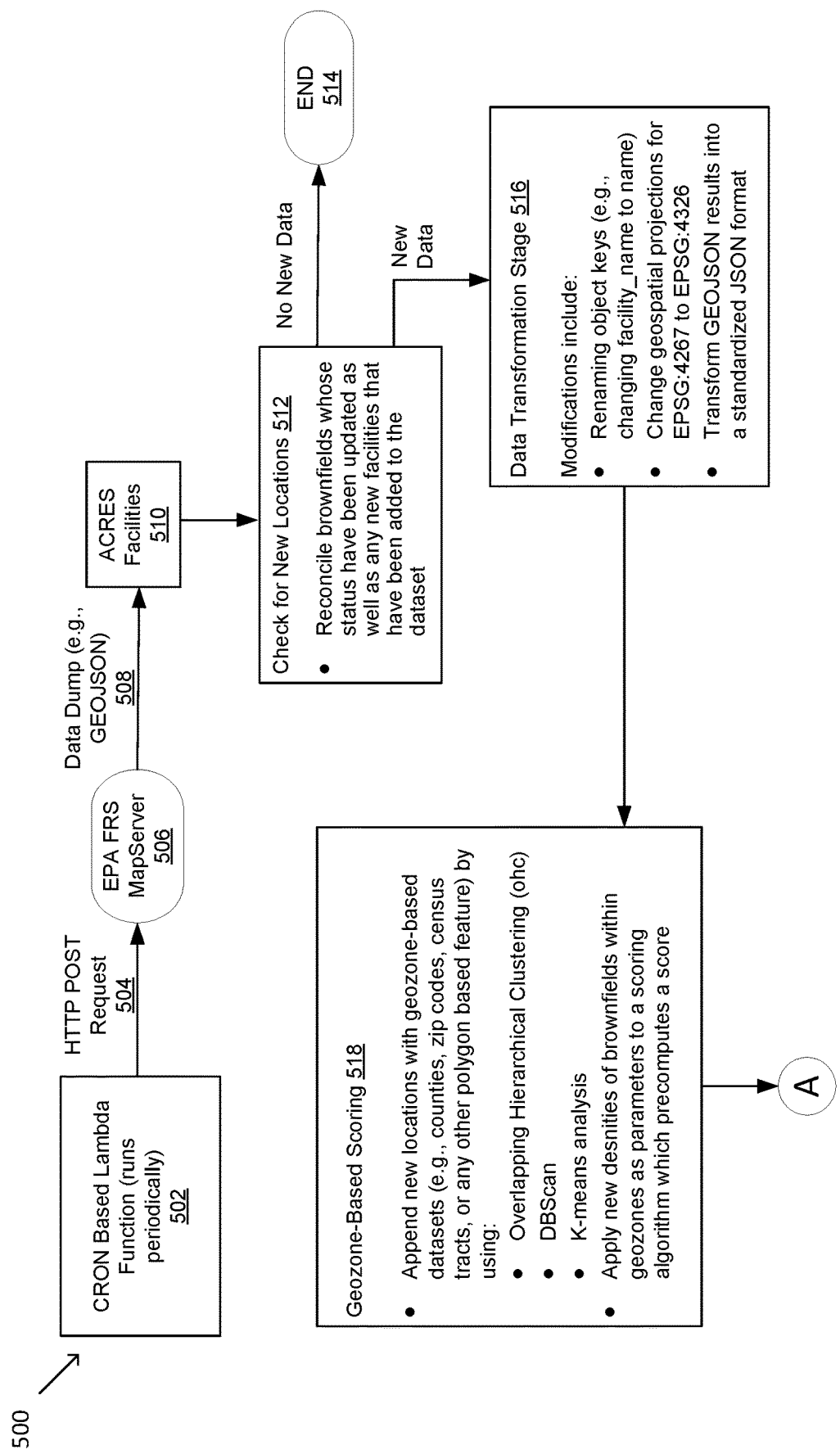
FIGS. 5A and 5B illustrate a flow diagram illustrating an example method for transforming environmental hazard and risk data and for searching consistent environmental hazard and risk data for brownfields, in accordance with embodiments.
Figure 5B:
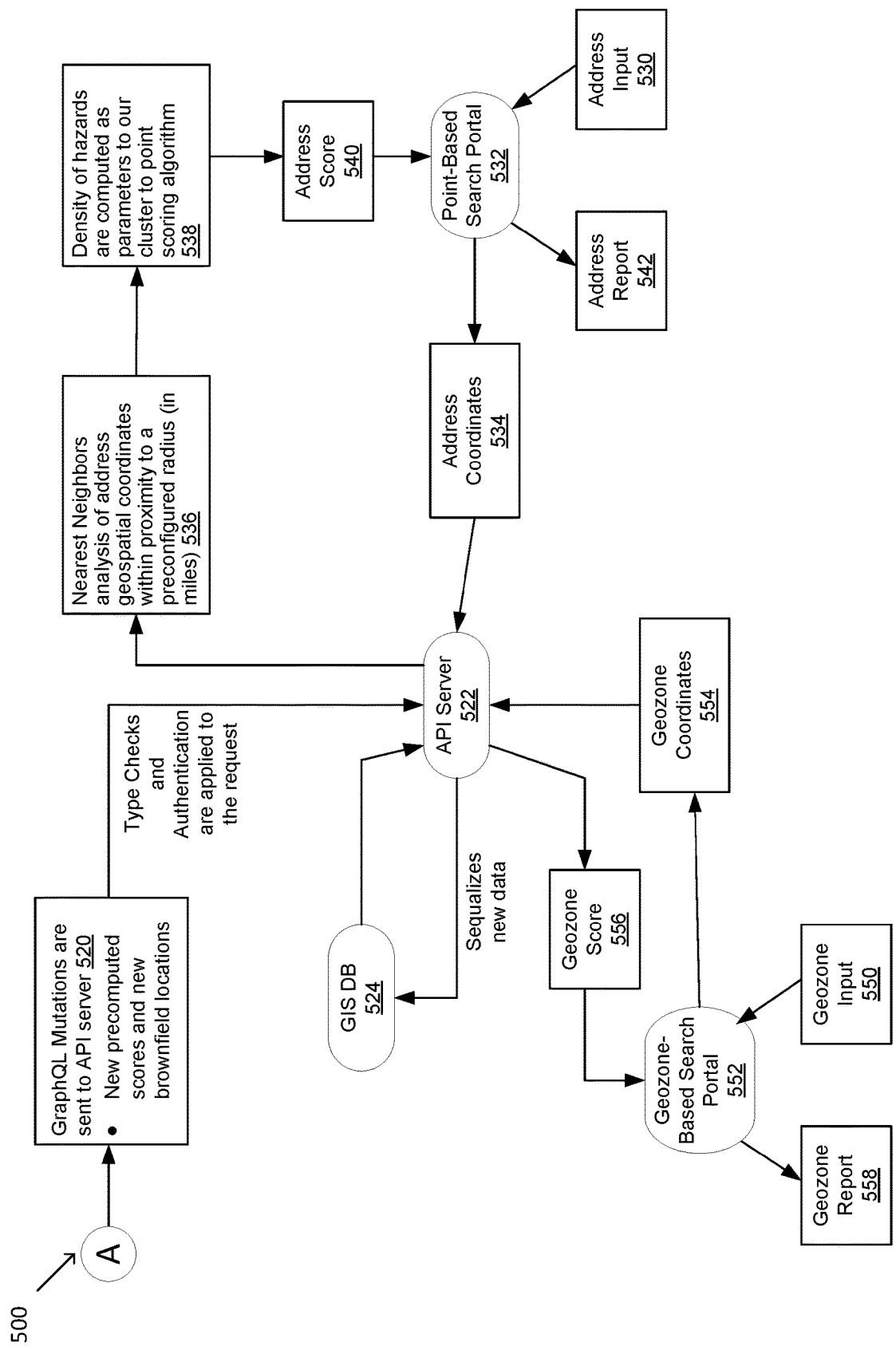

FIGS. 5A and 5B illustrate a data flow diagram 500 of an example system method for transforming environmental hazard and risk data and for searching consistent environmental hazard and risk data for brownfields, in accordance with embodiments. At block 500, a CRON Based Lambda Function that runs periodically (e.g., daily) makes an HTTP POST Request 504 to EPA FRS MapServer 506. In the illustrated example, the request is for information marked "ACRES" to identify brownfield locations. Data Dump 508 (e.g., in GeoJSON format) including ACRES facilities 510 is returned. At block 512, a check for new brownfield locations is performed. In some embodiments, the data received is reconciled against stored data to determine whether new data is received. If there is no new data received after comparison to the stored data, the process completes, as shown at block 514. If new data is identified, the new data is forwarded to data transformation stage 516.

At data transformation stage 516, the data is transformed into consistent data that can be compared and analyzed appropriately in a normalized fashion. For example, transformations to brownfield data can include: renaming object keys (e.g., changing facility_name to name), changing geospatial projections (e.g., transforming EPSG:4269 data format to EPSG:4326 data format), transforming GeoJSON results into a standardized JSON format, etc. Data transformation stage 516 generates transformed brownfield data, and forwards the transformed brownfield data block 518 for performing geozone based scoring.

At block 518, area-based scoring operation are performed to allow for the precomputation and storage of the precomputed scores, that can ultimately be returned responsive to search request. Scoring operations are applied to the brownfield data (e.g., brownfield hazard data) to provide information of the relative risk associated with brownfields. The scoring operations are applied to an area, also referred to herein as a geozone. In accordance with some embodiments, the geozone based scoring operation appends locations with geozone based datasets (e.g., counties, zip codes, census tracts, or any other polygon based feature).

Locations are appended with geozone based datasets (e.g., counties, zip codes, census tracts, or any other polygon based feature). Various operations can be used to append the locations using different operations, such as and without limitation: Overlapping Hierarchical Clustering (OHC), DBScan, and K-means analysis. New densities of brownfields are applied within the geozones as parameters to the scoring algorithm which precomputes a score. It should be appreciated that these operations generally associate brownfields risks, and the scores thereof, to geographic regions (e.g., geozones). The transformed brownfield data and associated scoring information are forwarded to an API server for storage.

With reference to FIG. 5B, at block 520, the scoring information is forwarded as a GraphQL Mutation to an API server 522. In some embodiments, type checks and authentication are applied to the request. In some embodiments, API server 522 sequalizes the new data. The transformed brownfield data and associated scoring information are forwarded to geographic information system (GIS) database (DB) 524 for persistent storage.

In accordance with the illustrated embodiments, a search of environmental risks associated with brownfields is performed responsive to a user request. It should be appreciated that the user search request can be in the form of a point-based search (e.g., an address) or a geozone-based search (e.g., a zip code or city). While the point-based search portal 532 and geozone-based search portal 552 are shown as separate portals, it should be appreciated that they can be the same portal capable of receiving both point-based and geozone-based inputs.

Address input 530 is received at point-based search portal 532. Address input 530 is converted to address coordinates 534 and communicated to API server 522 for retrieving the queried information (e.g., brownfields). At block 536, a nearest neighbors analysis of the retrieved brownfield information and the address geospatial coordinates within proximity to a preconfigured radius (e.g., in miles) is performed. This allows for the density of hazards to be computed as parameters to the cluster to point scoring algorithm, as shown at block 538. Address score 540 is calculated and output to the user as part of address report 542.

Geozone input 550 is received at geozone-based search portal 552. Geozone input 550 is converted to geozone coordinates 554 and communicated to API server 522 for retrieving the queried information (e.g., brownfields). Geozone score 556 is calculated and output to the user as part of geozone report 558.

Example Computer System

Figure 6:
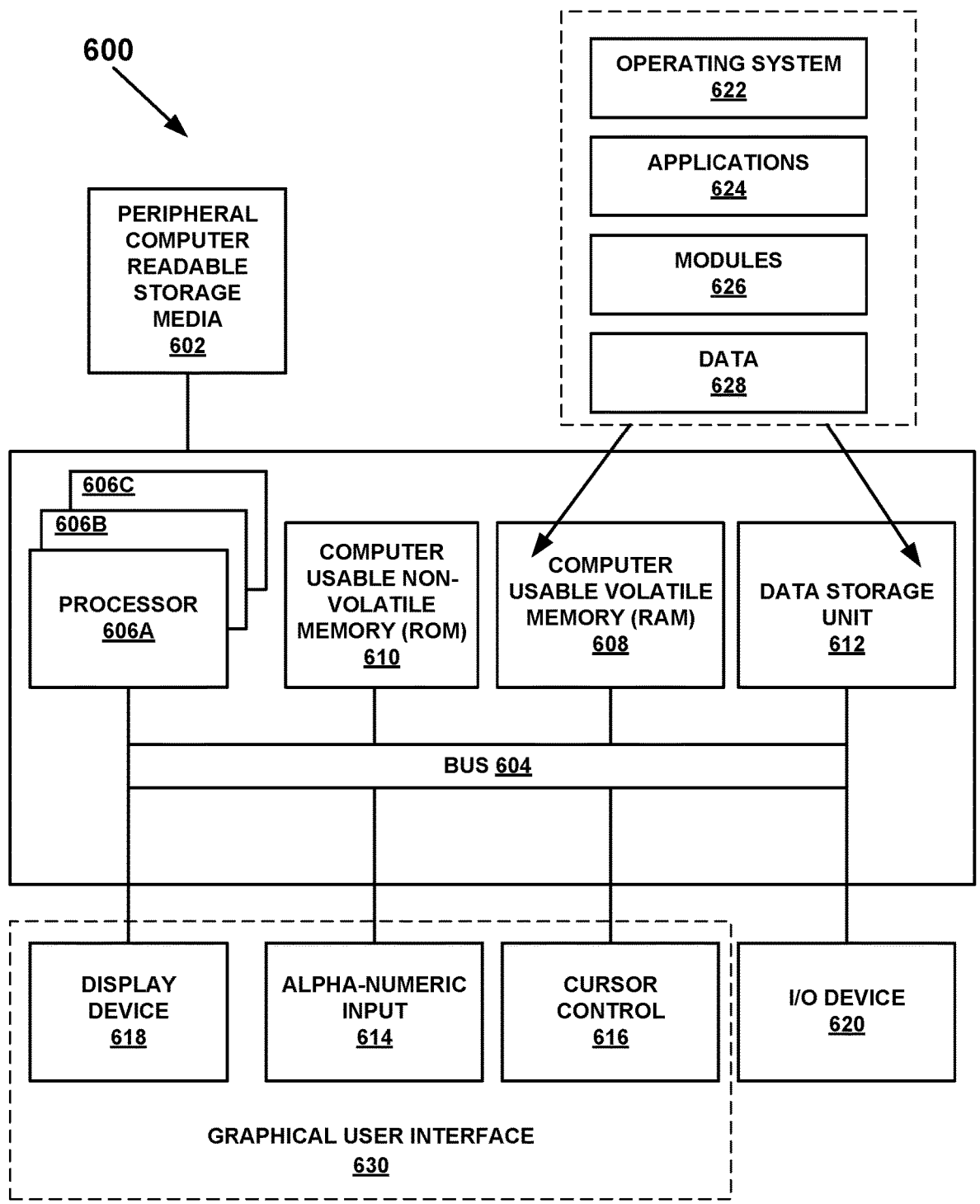
FIG. 6 is a block diagram of an example computer system upon which embodiments of the present invention can be implemented.

FIG. 6 is a block diagram of an example computer system 600 upon which embodiments of the present invention can be implemented. FIG. 6 illustrates one example of a type of computer system 600 (e.g., a computer system) that can be used in accordance with or to implement various embodiments which are discussed herein.

It is appreciated that computer system 600 of FIG. 6 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 600 of FIG. 6 is well adapted to having peripheral tangible computer-readable storage media 602 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 600 of FIG. 6 includes an address/data bus 604 for communicating information, and a processor 606A coupled with bus 604 for processing information and instructions. As depicted in FIG. 6, computer system 600 is also well suited to a multi-processor environment in which a plurality of processors 606A, 606B, and 606C are present. Conversely, computer system 600 is also well suited to having a single processor such as, for example, processor 606A. Processors 606A, 606B, and 606C may be any of various types of microprocessors. Computer system 600 also includes data storage features such as a computer usable volatile memory 608, e.g., random access memory (RAM), coupled with bus 604 for storing information and instructions for processors 606A, 606B, and 606C. Computer system 600 also includes computer usable non-volatile memory 610, e.g., read only memory (ROM), coupled with bus 604 for storing static information and instructions for processors 606A, 606B, and 606C. Also present in computer system 600 is a data storage unit 612 (e.g., a magnetic or optical disc and disc drive) coupled with bus 604 for storing information and instructions. Computer system 600 also includes an alphanumeric input device 614 including alphanumeric and function keys coupled with bus 604 for communicating information and command selections to processor 606A or processors 606A, 606B, and 606C. Computer system 600 also includes an cursor control device 616 coupled with bus 604 for communicating user input information and command selections to processor 606A or processors 606A, 606B, and 606C. In one embodiment, computer system 600 also includes a display device 618 coupled with bus 604 for displaying information.

Referring still to FIG. 6, display device 618 of FIG. 6 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 616 allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, touch screen, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. Computer system 600 is also well suited to having a cursor directed by other means such as, for example, voice commands. In various embodiments, alphanumeric input device 614, cursor control device 616, and display device 618, or any combination thereof (e.g., user interface selection devices), may collectively operate to provide a graphical user interface (GUI) 630 under the direction of a processor (e.g., processor 606A or processors 606A, 606B, and 606C). GUI 630 allows user to interact with computer system 600 through graphical representations presented on display device 618 by interacting with alphanumeric input device 614 and/or cursor control device 616.

Computer system 600 also includes an I/O device 620 for coupling computer system 600 with external entities. For example, in one embodiment, I/O device 620 is a modem for enabling wired or wireless communications between computer system 600 and an external network such as, but not limited to, the Internet. In one embodiment, I/O device 620 includes a transmitter. Computer system 600 may communicate with a network by transmitting data via I/O device 620.

Referring still to FIG. 6, various other components are depicted for computer system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer-readable storage media.

Example Methods of Operation

Figure 7:
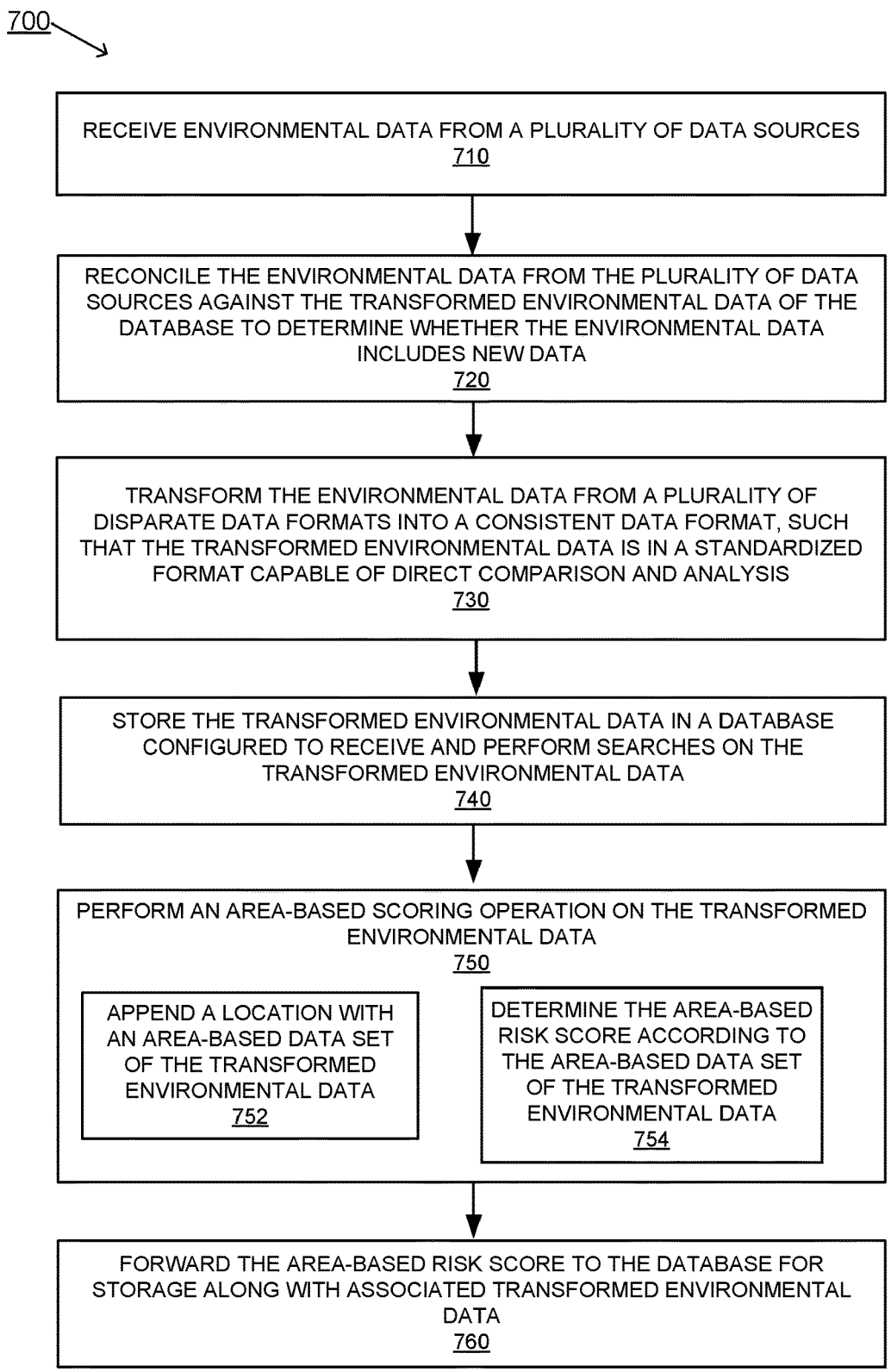
FIG. 7 illustrates a flow diagram of an example method for transformation of inconsistent environmental data, according to embodiments.
Figure 8:
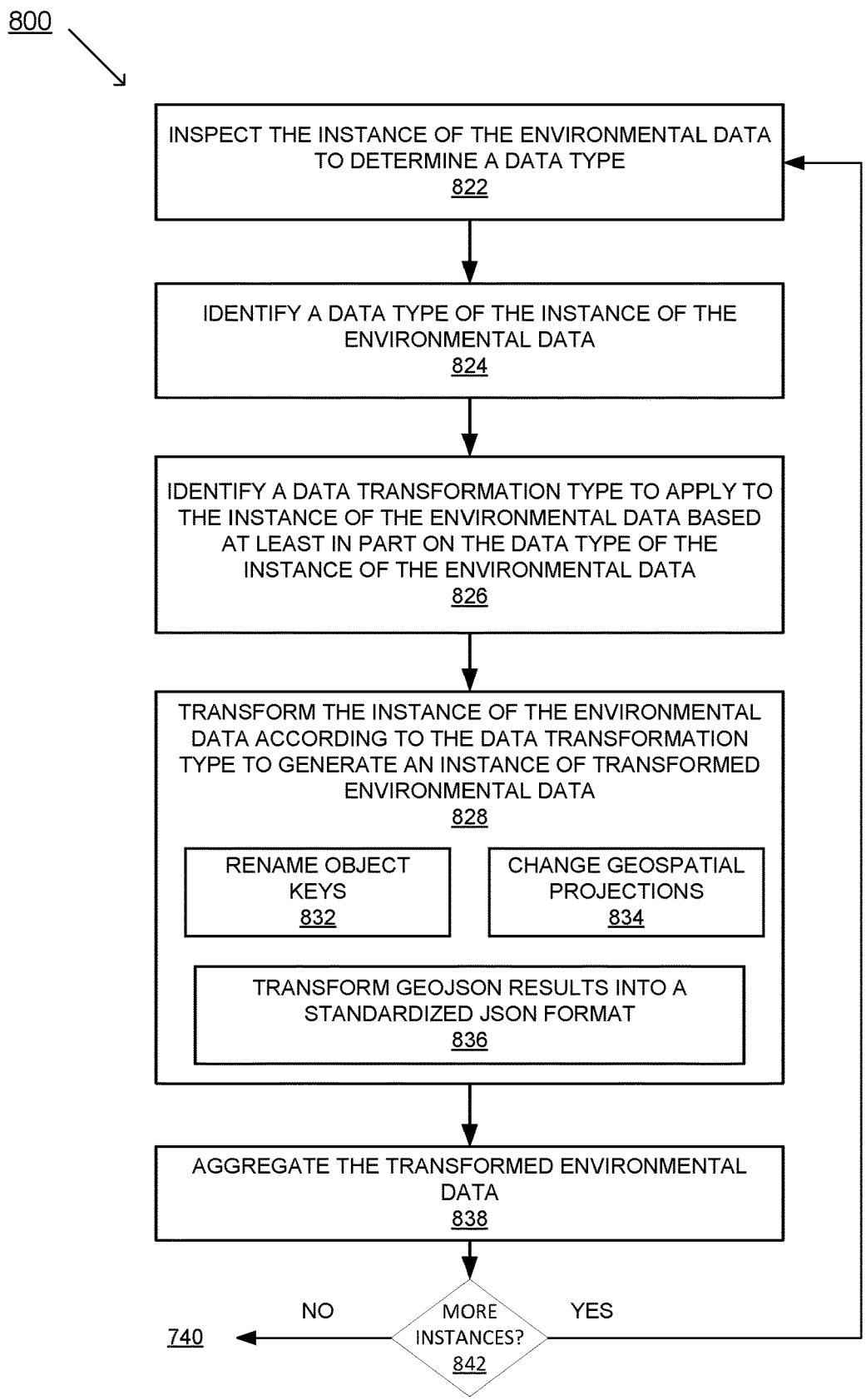
FIG. 8 illustrates a flow diagram of an example method to transform the environmental data from the plurality of disparate data formats into a consistent data format, according to embodiments.
Figure 9:
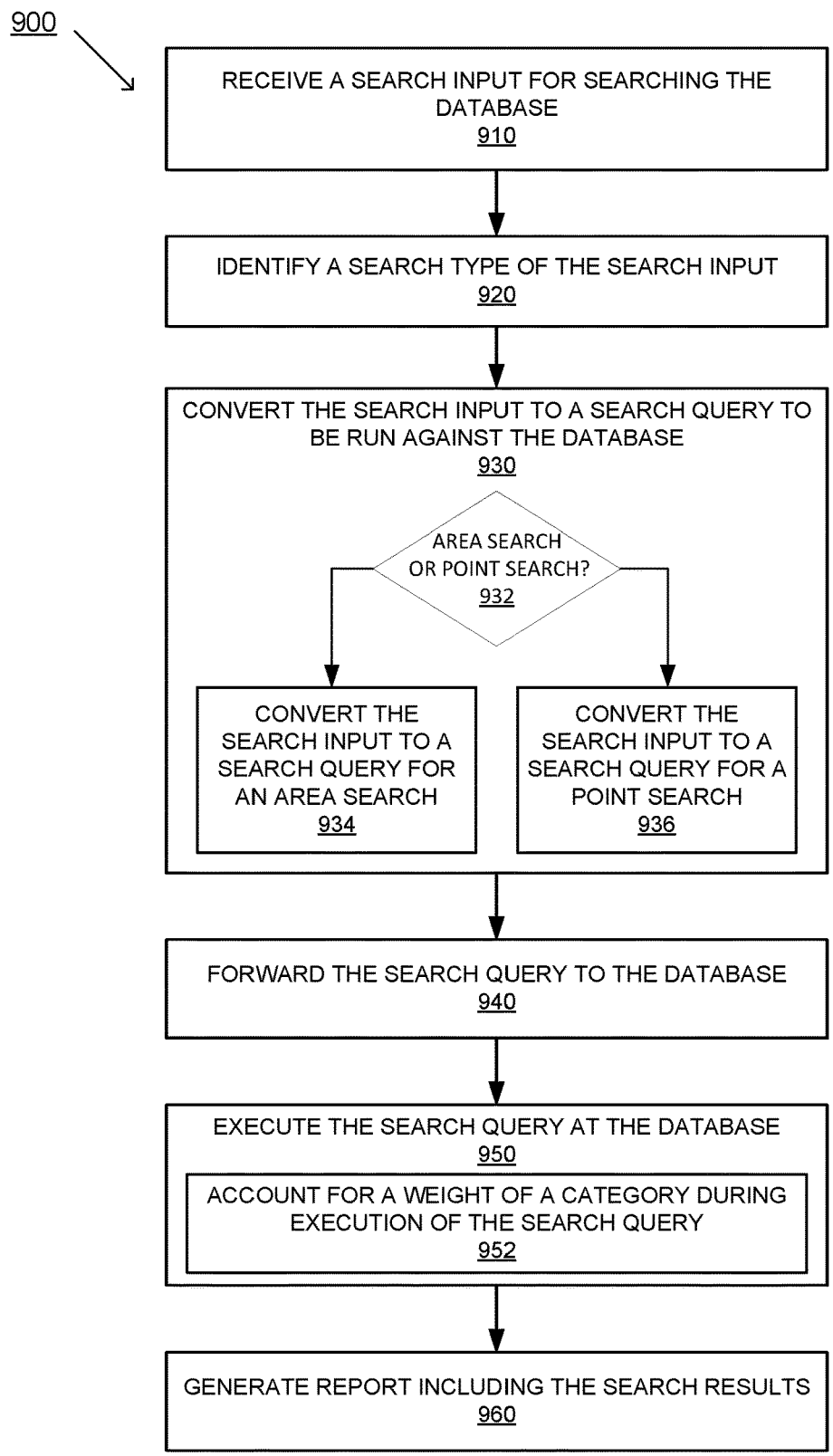
FIG. 9 illustrates a flow diagram of an example method for searching transformed environmental data, according to embodiments.

The following discussion sets forth in detail the operation of some example methods of operation of embodiments. With reference to FIGS. 7 through 9, flow diagrams 700, 800, and 900 illustrate example procedures used by various embodiments. The flow diagrams 700, 800, and 900 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 600). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 700, 800, and 900 may be performed in an order different than presented and/or not all of the procedures described in flow diagrams 700, 800, and 900 may be performed. It is further appreciated that procedures described in flow diagrams 700, 800, and 900 may be implemented in hardware, or a combination of hardware with firmware and/or software provided by computer system 600.

FIG. 7 depicts a flow diagram 700 for transformation of inconsistent environmental data, according to an embodiment. At procedure 710 of flow diagram 700, environmental data is received from a plurality of data sources, wherein each data source of the plurality of data sources is associated with a geographic region and maintains the environmental data using at least one data format of a plurality of disparate data formats, such that the environmental data is received in the plurality of disparate data formats. At procedure 720, in accordance with some embodiments, the environmental data from the plurality of data sources is reconciled against transformed environmental data of the database to determine whether the environmental data includes new data. Provided the environmental data does not include new data, the environmental data received is discarded. It should be appreciated that the operations of procedure 720 can be performed before or after procedure 730.

At procedure 730, the environmental data from the plurality of disparate data formats is transformed into a consistent data format, such that the transformed environmental data is in a standardized format capable of direct comparison and analysis. In some embodiments, the transformed environmental data is standardized form capable of direct comparison and analysis across a plurality of geographic regions. In accordance with various embodiments, procedure 730 is performed according to flow diagram 800 of FIG. 8.

Flow diagram 800 of FIG. 8 illustrates example procedures of a method to transform the environmental data from the plurality of disparate data formats into a consistent data format, according to embodiments. Flow diagram 800 illustrates pertains to the transformation of instances of data, where the procedures of flow diagram 800 are performed on each instance of environmental data received. At procedure 822 of flow diagram 800, the instance of the environmental data is inspected to determine a data type. At procedure 824, a data type of the instance of the environmental data is identified. At procedure 826, a data transformation type to apply to the instance of the environmental data is determined based at least in part on the data type of the instance of the environmental data.

In some embodiments, as shown at procedure 828, the instance of the environmental data is transformed according to the data transformation type to generate an instance of transformed environmental data. It should be appreciated that the data transformation can be performed according to any transformation type, without limitation, of which procedures 832, 834, and 836 are examples, and that one or more transformations can be performed. For instance, at procedure 832, object keys of the environmental data are renamed. At procedure 834, geospatial projections of the environmental data are changed. At procedure 836, GeoJSON results of the environmental data are transformed into a standardized JSON format.

In accordance with various embodiments, at procedure 838, the transformed environmental data is aggregated. At procedure 842, it is determined whether there are more instances of environmental data to transform. If there are more instances of environmental data to transform, flow diagram 800 returns to procedure 822 with the next instance of environmental data. If there are note more instances of environmental data to transform, flow diagram 800 proceeds to procedure 740 of flow diagram 700 of FIG. 7.

With reference to FIG. 7, at procedure 740, the transformed environmental data is stored in a database configured to receive and perform searches on the transformed environmental data. In some embodiments, as shown at procedure 750, an area-based scoring operation is performed on the transformed environmental data. In some embodiments, the area-based scoring operation generates an area-based risk score representative of geographic-based relative risk associated with a particular hazard. In one embodiment, as shown at procedure 752, performing the area-based scoring operation on the transformed environmental data includes appending a location with an area-based data set of the transformed environmental data. In some embodiments, the location includes one of: a county, a zip code, a census tract, and a polygon-based feature. In one embodiment, as shown at procedure 754, performing the area-based scoring operation on the transformed environmental data includes determining the area-based risk score according to the area-based data set of the transformed environmental data. In some embodiments, as shown at procedure 760, the area-based risk score is forwarded to the database for storage along with associated transformed environmental data.

FIG. 9 illustrates a flow diagram 900 of an example method for searching transformed environmental data, according to embodiments. At procedure 910, a search input for searching the database including the transformed environmental data is received, where the search input includes a search location. In one embodiment, the search input also includes at least one weight for a category of the transformed environmental data. At procedure 920, a search type of the search input is identified based at least in part on the search location. In one embodiment, the search location is an area, such that the search type is an area search. In another embodiment, the search location is a point such that the search type is a point search.

At procedure 930, the search input is converted to a search query to be run against the database including the transformed environmental data. In accordance with various embodiments, the search input can be geocoded or reverse geocoded into a geospatial coordinate. At procedure 932, it is determined whether the search type is an area search or a point search. Where the search type is an area search, as shown at procedure 934, the search input is converted to the search query for an area search. Where the search type is a point search, as shown at procedure 934, the search input is converted to the search query for a point search.

At procedure 940, the search query is forwarded to the database including the transformed environmental data for execution. At procedure 950, the search query is executed at the database including the transformed environmental data, where search results of the search query include transformed environmental data relevant to the location. In one embodiment, as shown at procedure 952, where the search input further includes at least one weight for a category of the transformed environmental data, executing the search query includes accounting for the at least one weight for the category of the transformed environmental data during the executing, such that the search results reflect the at least one weight for the category of the transformed environmental data. At procedure 960, a report including the search results is generated.

It is noted that any of the procedures, stated above, regarding the flow diagrams of FIGS. 7 through 9 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Conclusion

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. The description as set forth is not intended to be exhaustive or to limit the embodiments to the precise form disclosed. Rather, the specific features and acts described above are disclosed as example forms of implementing the claims. In the claims, elements and/or steps do not imply any particular order of operation, unless explicitly stated in the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for transformation of inconsistent environmental data, the method comprising:
receiving environmental data from a plurality of data sources, wherein each data source of the plurality of data sources is associated with a geographic region and maintains the environmental data using at least one data format of a plurality of disparate data formats, such that the environmental data is received in the plurality of disparate data formats;
transforming the environmental data from the plurality of disparate data formats into a consistent data format, such that the transformed environmental data is in a standardized format capable of direct comparison and analysis, wherein the transforming the environmental data from the plurality of disparate data formats into the consistent data format comprises:
for an instance of the environmental data:
inspecting the instance of the environmental data to determine a data type;
identifying a data type of the instance of the environmental data;
identifying a data transformation type to apply to the instance of the environmental data based at least in part on the data type of the instance of the environmental data; and
transforming the instance of the environmental data according to the data transformation type to generate an instance of transformed environmental data; and
aggregating the transformed environmental data; and
storing the transformed environmental data in a database configured to receive and perform searches on the transformed environmental data.

2. The computer-implemented method of claim 1, wherein the transforming the instance of the environmental data according to the data transformation type to generate the instance of transformed environmental data comprises at least one of:
renaming object keys;
changing geospatial projections; and
transforming GeoJSON results into a standardized JSON format.

3. The computer-implemented method of claim 1, wherein the transformed environmental data is standardized form capable of direct comparison and analysis across a plurality of geographic regions.

4. The computer-implemented method of claim 1, further comprising:
prior to the transforming the environmental data, reconciling the environmental data from the plurality of data sources against the transformed environmental data of the database to determine whether the environmental data includes new data; and
provided the environmental data does not include new data, discarding the environmental data prior to the transforming the environmental data.

5. The computer-implemented method of claim 1, further comprising:
performing an area-based scoring operation on the transformed environmental data, wherein the area-based scoring operation generates an area-based risk score representative of geographic-based relative risk associated with a particular hazard.

6. The computer-implemented method of claim 5, wherein the performing an area-based scoring operation on the transformed environmental data comprises:
    appending a location with an area-based data set of the transformed environmental data; and
    determining the area-based risk score according to the area-based data set of the transformed environmental data.

7. The computer-implemented method of claim 5, further comprising:
    forwarding the area-based risk score to the database for storage along with associated transformed environmental data.

8. The computer-implemented method of claim 5, wherein a location comprises one of: a county, a zip code, a census tract, and a polygon-based feature.

9. The computer-implemented method of claim 1, further comprising:
    receiving a search input for searching the database comprising the transformed environmental data, the search input comprising a search location;
    identifying a search type of the search input based at least in part on the search location;
    converting the search input to a search query to be run against the database comprising the transformed environmental data; and
    forwarding the search query to the database comprising the transformed environmental data for execution.

10. The computer-implemented method of claim 9, wherein the search location is an area, such that the search type is an area search.

11. The computer-implemented method of claim 10, the converting the search input to a search query to be run against the database comprising the transformed environmental data comprising:
    converting search input to the search query for an area search.

12. The computer-implemented method of claim 9, wherein the search location is a point such that the search type is a point search.

13. The computer-implemented method of claim 12, the converting the search input to a search query to be run against the database comprising the transformed environmental data comprising:
    converting search input to the search query for a point search.

14. The computer-implemented method of claim 9, further comprising:
    executing the search query at the database comprising the transformed environmental data, wherein search results of the search query comprise transformed environmental data relevant to the search location; and
    generating a report comprising the search results.

15. The method of claim 14, wherein the search input further comprises at least one weight for a category of the transformed environmental data, wherein the executing the search query at the database comprising the transformed environmental data comprises:
    accounting for the at least one weight for the category of the transformed environmental data during the executing, such that the search results reflect the at least one weight for the category of the transformed environmental data.

16. A computer-implemented method for transformation of inconsistent environmental data, the method comprising:
    receiving environmental data from a plurality of data sources, wherein each data source of the plurality of data sources is associated with a geographic region and maintains the environmental data using at least one data format of a plurality of disparate data formats, such that the environmental data is received in the plurality of disparate data formats;
    transforming the environmental data from the plurality of disparate data formats into a consistent data format, such that the transformed environmental data is in a standardized format capable of direct comparison and analysis, wherein the transforming the environmental data from the plurality of disparate data formats into the consistent data format comprises:
    for an instance of the environmental data:
        inspecting the instance of the environmental data to determine a data type;
        identifying a data type of the instance of the environmental data;
        identifying a data transformation type to apply to the instance of the environmental data based at least in part on the data type of the instance of the environmental data; and
        transforming the instance of the environmental data according to the data transformation type to generate an instance of transformed environmental data, wherein the transforming the instance of the environmental data according to the data transformation type to generate the instance of transformed environmental data comprises at least one of:
            renaming object keys;
            changing geospatial projections; and
            transforming GeoJSON results into a standardized JSON format; and
    storing the transformed environmental data in a database configured to receive and perform searches on the transformed environmental data.

17. A computer-implemented method for transformation of inconsistent environmental data, the method comprising:
    receiving environmental data from a plurality of data sources, wherein each data source of the plurality of data sources is associated with a geographic region and maintains the environmental data using at least one data format of a plurality of disparate data formats, such that the environmental data is received in the plurality of disparate data formats;
    transforming the environmental data from the plurality of disparate data formats into a consistent data format, such that the transformed environmental data is in a standardized format capable of direct comparison and analysis;
    storing the transformed environmental data in a database configured to receive and perform searches on the transformed environmental data; and
    performing an area-based scoring operation on the transformed environmental data, wherein the area-based scoring operation generates an area-based risk score representative of geographic-based relative risk associated with a particular hazard, wherein the performing an area-based scoring operation on the transformed environmental data comprises:
        appending a location with an area-based data set of the transformed environmental data; and
        determining the area-based risk score according to the area-based data set of the transformed environmental data.

* * * * *